July 13, 1965 R. L. KUJAWA ETAL 3,195,091

NON-LINEAR RESISTANCE DEVICES

Filed May 13, 1963 2 Sheets-Sheet 1

"PRIOR ART"

"PRIOR ART"

INVENTORS
Richard L. Kujawa
Max S. Macrander

BY C. A. Gulbrandsen
ATTY.

July 13, 1965 R. L. KUJAWA ETAL 3,195,091

NON-LINEAR RESISTANCE DEVICES

Filed May 13, 1963 2 Sheets-Sheet 2

INVENTORS
Richard L. Kujawa
Max S. Macrander

BY

ATTY.

United States Patent Office 3,195,091

Patented July 13, 1965

3,195,091

NON-LINEAR RESISTANCE DEVICES

Richard L. Kujawa, Westchester, and Max S. Macrander, Wheaton, Ill., assignors to Automatic Electric Laboratories, Inc., Northlake, Ill., a corporation of Delaware Filed May 13, 1963, Ser. No. 279,948
3 Claims. (Cl. 338—20)

The invention relates to logic arrangements and to non-linear input devices for such logic arrangements.

One of the problems encountered in the tandem connection of multiple input logic circuits is the current loss to several input circuits because of the relatively low input impedance that is seen by the individual preceding circuits. W. D. Rowe, in his U.S. Patent 3,032,664 shows that for a single input to a NOR logic circuit the output current is equal to the transistor saturation current that is switched, that is assuming zero current loss in auxiliary input circuits. Rowe teaches, in effect, a constant current source in the output of a logic circuit to supply the individual current losses in the following stages. In contrast to the teachings of Rowe, we minimize the input current losses of the logic circuit instead of using a preceding circuit to supply these loss currents. This is done by employing a multi-element voltage sensitive non-linear resistance device in combination with a transistor circuit. As far as the use of a non-linear element is concerned the present invention is considered to be an improvement in the co-pending application of W. R. Wedmore, Serial Number 228,697, filed October 5, 1962 and assigned to the same assignee as the present invention.

Symmetrical non-linear resistance devices, commonly known as varistors, have a current-voltage relation expressed by the equation $$I=KV^n \quad (1)$$

where $n \neq 1$ and where K and $n$ are physical constants of the non-linear material.

$$\text{The D.C. resistance}=\frac{V}{I}=\frac{V}{KV^n}=\frac{1}{KV^{n-1}} \quad (2)$$

$$\text{The A.C. resistance}=\frac{dV}{dI}=\frac{1}{nKV^{n-1}} \quad (3)$$

For most practical devices $n>2$. If $n>1$, the non-linear resistance exhibits a high resistance for low terminal voltages and a low resistance for relatively higher terminal voltages. This characteristic may advantageously be employed in connection with electrical gate or logic circuits having a transistor as the switching element. Voltage potentials across a non-linear resistance element, the elements being voltage sensitive as defined by the above current-voltage relationships, can control the amount of current loss in each individual gate input circuit. By taking advantage of this relationship, the multiple-input-output NOR logic circuit of the present invention has increased fan-in and fan-out capabilities which allows greater versatility in tandem connected circuit design.

A multi-electrode or multi-element non-linear resistance device having its electrical characteristics governed by the above relationships is advantageously employed as the input device of the aforementioned combination. Generally, this type of device is described by T. B. Tomlinson in his article "Switching Circuits Using Bi-Directional Non Linear Impedances" published in the September 1959 issue of the Journal of the British Institute of Radio Engineers. Such a device has individual electrodes dispersed upon and attached to the surface of a semiconductor disc, say silicon carbide. This type of non-linear disc is manufactured in one instance by placing the powder or granular non-linear material in a die, scraping across the surface of the die to remove excess material, compressing the material in the die and firing the disc in an oven. The scraping action to remove excess material causes a non-uniformity of material thickness and the finished disc is compressed with a flat faced tool resulting in a disc having a wedge-shaped cross-section. Therefore, each of the individual elements contained therein are of a different thickness. F. A. Schwertz and J. J. Mazenko in their article "Nonlinear Semiconductor Resistors," published in the August 1953 issue of the Journal of Applied Physics, volume 24, Number 8, show that material thickness of granular aggregate has a pronounced effect on the application of expression (1) by the empirical equation $$K=kAP^{n/m}d^{n-z}/t^n \quad (4)$$

where $k$ and $m$ are constants of the particular semiconductor material, P is the pressure applied to compress the granular aggregate, $d$ is the average diameter of grain and $t$ is the material thickness. Employing the empirical Equation 4 to expression (1) gives the relation of current I to voltage V $$I=kAP^{n/m}d^{n-z}V^n/t^n \quad (5)$$

or $$I=CV^n/t^n \quad (6)$$

Knowing that the resistance of the material is also related to its thickness, this of course would complicate the input circuit design for the individual input stages if the individual elements were of different thickness. To alleviate this situation, we employ in our novel logic circuit an input device having a relatively high degree of uniformity in individual element thickness. The non-linear material, compressed by a tool having a plurality of extrusions on its face, has indentations compressed in the side which is to carry a plurality of electrodes providing each element with relatively uniform thickness between the bottom of the indentations and the single electrode surface.

The object of the invention is to provide a novel and improved logic arrangement.

Another object of the invention is to provide as the input circuitry of a logic arrangement a multi-element non-linear resistance device having a relatively high degree of thickness uniformity for its individual resistance elements.

Another object of the invention is to provide a logic circuit arrangement having relatively high fan-in and fan-out ratios.

A still further object of the invention is to provide a logic circuit arrangement that requires a minimum number of electrical component connections during its fabrication; therefore, saving time and lowering assembly costs.

Other objects and features of the invention will become apparent and the invention will best be understood by referring to the following description taken in conjunction with the accompanying drawings in which.

Figure 2:
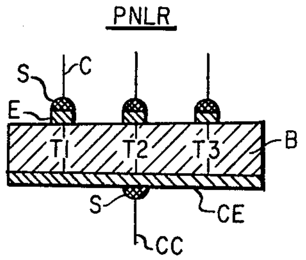
FIG. 2 is a section view of FIG. 1 showing the non-uniformity of disc thickness.
Figure 4:
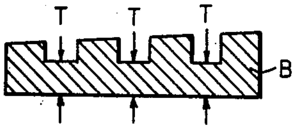
FIGS. 4 and 4A are section views of FIG. 3, FIG. 4 being a section view of the non-linear resistance material only.
Figure 4A:
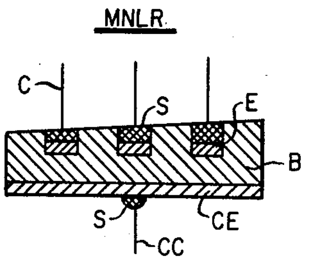

The section views of FIGS. 2, 4, and 4A are exaggerated for illustration only.

In order to better explain the invention, the following brief description of the multi-element non-linear resistance devices is given.

Figure 1:
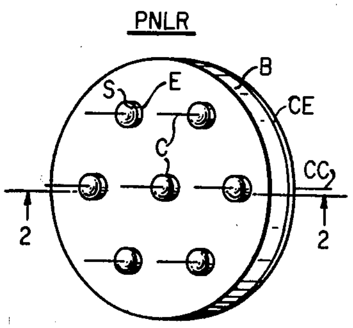
FIG. 1 is a view of a multi-element non-linear resistance of prior art design.

Referring to FIGS. 1 and 2, a prior art resistance device PNLR is shown having a semiconductor base material B. Attached to one side of the disc is a plurality of electrodes E, each having an individual electrical conductor C connected thereto by solder S or other suitable means. Attached to and covering the other side of the base B is a common electrode CE having a common electrical conductor CC connected thereto. The electrodes E and CE may be, for example, copper. It is to be understood that other electrode material and other means of connecting the conductors to the electrodes may be used. It can be seen that the electrodes CE serves as a common electrode to all of the non-linear resistances of the device. Each of the individual electrodes E may be projected through the base material and onto the common electrode CE; the electrical characteristics and the physical spacing of the electrodes being such that one non-linear resistance element described thereby does not adversely affect adjacent elements. That is, due to the electrical characteristics of the material the spacing between electrodes E is made sufficient to electrically isolate the electrodes one from the other. Referring specifically to FIG. 2, it can be seen that the disc of semiconductor material B has a wedge-shaped cross-section with $T1<T2<T3$. Since the resistance of the material varies in relation to its thickness, it is understandable that this non-uniformity of thickness is not desired.

Figure 3:
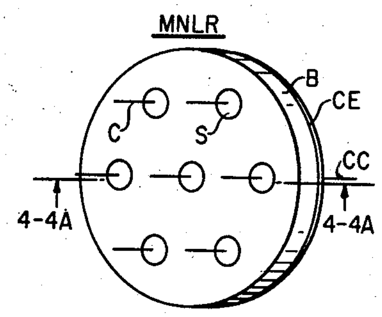
FIG. 3 is an embodiment of the multi-element non-linear resistance device of the present invention.

Referring now to FIGS. 3, 4 and 4A, it can be seen from FIG. 3 that the device MNLR has the same general outward appearance as the device PNLR of FIGS. 1 and 2. However, in referring to FIGS. 4 and 4A the similarity ends and it is obvious that the devices PNLR and MNLR are far different. Construction of the base B of the device MNLR produces a semiconductor disc having a plurality of indentations or wells therein on one surface and a relatively uniform thickness at the individual electrode positions, that is the thickness T is substantially the same for all elements regardless of an overall wedge-shaped cross-section. The individual electrodes E are fixed to the disc B at the bottom of each well and the individual conductors C are attached to the electrodes by a solder fill S. A common electrode CE is affixed to the opposite side of the disc and the common conductor CC is attached thereto by solder S. Here again, the electrodes E and CE may be, of example, copper and the electrical conductors C and CC may advantageously be soldered to their respective electrodes and the electrodes to the disc. It is to be understood that the means for connecting conductor to electrode and electrode to disc may be modified or changed to be most suitable to the particular fabricator and that the particular semi-conductor material should be chosen in accordance with the specific electrical requirements.

Figure 5:
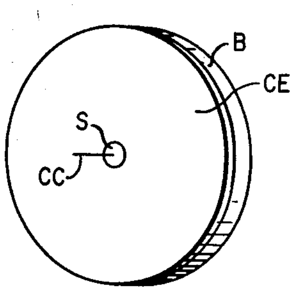
FIG. 5 is a view showing the common electrode side of FIG. 1 and FIG. 3.
Figure 6:
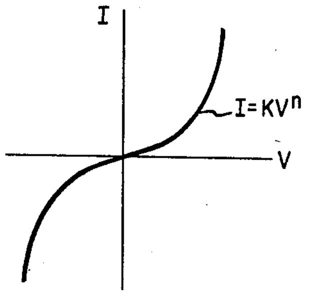
FIG. 6 is a characteristic curve for a material having the current-voltage relationship of expression 1.

FIGS. 5 and 6 are self explanatory from the above and need no further explanation.

Figure 7:
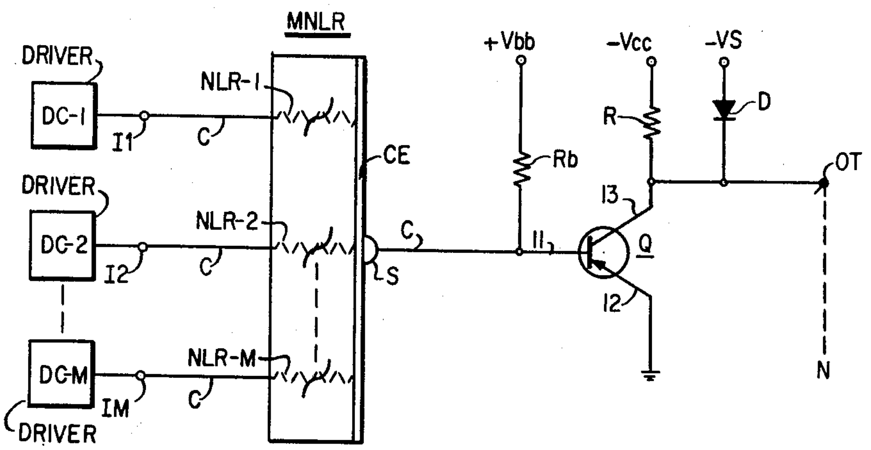
FIG. 7 is an embodiment of our novel logic arrangement schematically showing our multi-element non-linear resistance device.

Referring now to FIG. 7, a NOR logic circuit arrangement is described having as its switching element the transistor Q. The arrangement shown utilizes a PNP transistor connected in a grounded emitter configuration with its base electrode 11 connected to the positive potential $Vbb$ via biased resistor $Rb$. The base electrode is also connected to the common electrode CE of the device MNLR by the electrical conductor CC. The emitter 12 is connected to ground potential and the collector 13 is connected to the negative potentials $Vcc$ and $Vs$ via resistance R and the clamping diode D, respectively. The collector electrode may also be connected at output terminal OT to a plurality of output stages N (not shown), which may be similar to the circuit just described. Electrically, the device MNLR has a plurality of non-linear resistance devices NLR–1, NLR–2 . . . NLR–M connected by conductors C to their respective input terminals I1, I2 . . . IM and to the driving circuits DC–1, DC–2 . . . DC–M. The circuit is conditioned so that transistor Q is normally conducting (saturated) if one or more of the inputs I1, I2 . . . IM is placed at a potential to overcome the biasing circuit ($Vbb$, $Rb$) by the driving circuits DC–1, DC–2, . . . DC–M. The driving circuits may be similar to the circuit just described or may be any other suitable driving means. If all of the input terminals are at a low enough potential, the biasing circuit will cut off the transistor Q. Assume for a moment that the individual inputs employ linear resistances instead of non-linear resistances and that driver DC–1 conditions input I1 so as to overcome the bias and enable transistor Q. Also assume that the other M–1 driver circuits are placing a ground potential on leads I2 to IM. The potential that is developed at the common electrical connection CC will cause a loss current to flow in each of the parallel resistances that correspond to inputs I2 to IM. The summation of these currents could be relatively high in a circuit having many inputs. Furthermore, these resistances cannot be fixed resistances of high value to limit the loss currents unless all M resistances are made large, that is, without considerable design difficulty arising from different values of resistance in each input and the switching signal value of the transistor. Then too, when a driver is to condition an input circuit so as to cause the transistor to conduct, it is more desirable to have a small series resistance in the corresponding input circuit to minimize signal attenuation. Furthermore since current flows in opposite directions through the input resistances according to the condition of their corresponding input terminals and to the condition of transistor Q, symmetrical non-linear resistances are most suitable to minimize current losses. It is obvious that the non-linear resistance may be advantageously employed to overcome the above problems.

Assuming now that the linear resistances have been removed and FIG. 7 is as shown and that DC–1 causes the transistor Q to saturate. The small potential that is developed between common conductor CC and ground effects a high resistance in each of the M–1 inputs and the non-linear device MNLR serves to limit the current loss through the devices NLR–2 to NLR–M. At the same time driver DC–1 is causing NLR–1 to experience a relatively higher terminal voltage and therefore exhibit a relatively low resistance. Minimizing the input current losses causes the number of possible inputs M and therefore the number of possible outputs N to be increased in the present arrangement; however, a single composite non-linear device MNLR is the only input circuit component and the number of non-linear resistance circuit connections is equal to the number of inputs plus one, instead of being equal to twice the number of inputs; this is approximately a 50 percent decrease in input circuit connections. This decrease in components and the connections allows a decrease in the fabrication time for such circuits and a savings in cost of assembly.

A test circuit, using a 2N404 transistor and having ten inputs and ten outputs, gave a performance that was comparable to a four input, one output NOR gate having linear input resistances.

The illustrative embodiment shown herein employs a PNP transistor. It is of course possible to use an NPN transistor by observing the required polarity changes.

While we have specifically described our invention, changes and modifications may be made by one skilled in the art without departing from the spirit and scope of the invention and should be included in the appended claims.

What is claimed is:

1. A non-linear resistance device comprising: a base of non-linear resistance material having at least two sides, a top side and a bottom side, said top side having a plurality of indentations therein, the bottom surface of each of said indentations which is spaced from said top side being the same distance from said bottom side; a common electrode affixed to said bottom side of said base; and a plurality of other electrodes each affixed to the bottom surface of separate ones of said indentations, thereby to insure that said non-linear resistance material between said other electrodes and said common electrode forms individual non-linear resistances of the same value regardless of non-uniformities in said top side.

2. A non-linear resistance device, as claimed in claim 1, wherein said common electrode and said plurality of other electrodes each have electrical conductor means attached thereto.

3. A non-linear resistance device, as claimed in claim 1, wherein each of said plurality of indentations has a depth which is greater than the thickness of each of said plurality of other electrodes whereby there are voids between the surface of said top side and each of said other electrodes and wherein said device further includes a plurality of electrical conductor means each associated with a separate one of said other electrodes and a plurality of solder fills each obviating separate ones of said voids and bonding its corresponding electrical conductor means to the corresponding other electrode.

References Cited by the Examiner

Miller: Variable Resistance Transistor Logic Circuit, RCA Technical Notes, No. 350, November 1959.

ARTHUR GAUSS, *Primary Examiner.*